(12) United States Patent
Brockman et al.

(10) Patent No.: US 7,753,166 B2
(45) Date of Patent: Jul. 13, 2010

(54) RESONANT FREQUENCY ADJUSTOR AND METHOD OF UTILIZING THE SAME

(75) Inventors: Mark Brockman, RR2 Belle River (CA); Tom Brockman, LaSalle (CA); Lionel Peltier, Windsor (CA)

(73) Assignee: Windsor Machine & Stamping Ltd, Windsor, Ontario (CA)

( * ) Notice: Subject to any disclaimer, the term of this patent is extended or adjusted under 35 U.S.C. 154(b) by 521 days.

(21) Appl. No.: 11/608,617

(22) Filed: Dec. 8, 2006

(65) Prior Publication Data

US 2007/0131479 A1    Jun. 14, 2007

Related U.S. Application Data

(60) Provisional application No. 60/748,388, filed on Dec. 8, 2005.

(51) Int. Cl.
*F16F 7/00* (2006.01)
(52) U.S. Cl. .................. 181/207; 181/208; 181/209
(58) Field of Classification Search .......... 181/207, 181/208, 209, 227, 228, 271; 248/559; 188/378, 188/379
See application file for complete search history.

(56) References Cited

U.S. PATENT DOCUMENTS

| | | | | | |
|---|---|---|---|---|---|
| 3,314,503 | A | * | 4/1967 | Neubert | 188/379 |
| 4,066,058 | A | * | 1/1978 | Anderkay | 123/198 E |
| 4,697,781 | A | * | 10/1987 | Hamano et al. | 248/559 |
| 4,702,346 | A | * | 10/1987 | Uno et al. | 181/207 |
| 4,716,986 | A | * | 1/1988 | Umemoto et al. | 181/207 |
| 4,821,828 | A | * | 4/1989 | Schwerzler et al. | 180/68.4 |
| 4,835,972 | A | * | 6/1989 | Tugal et al. | 62/50.1 |
| 4,852,848 | A | * | 8/1989 | Kucera | 248/559 |
| 5,072,801 | A | * | 12/1991 | Freymann et al. | 180/68.5 |
| 5,193,644 | A | * | 3/1993 | Hart et al. | 181/207 |
| 5,445,241 | A | * | 8/1995 | Nakamura et al. | 180/296 |
| 5,637,938 | A | * | 6/1997 | Vukorpa et al. | 310/51 |
| 5,799,930 | A | * | 9/1998 | Willett | 267/141.4 |
| 5,873,429 | A | * | 2/1999 | Qutub | 180/309 |
| 6,068,081 | A | * | 5/2000 | Capdepuy et al. | 181/207 |
| 6,129,177 | A | * | 10/2000 | Gwinn | 181/207 |
| 6,216,833 | B1 | * | 4/2001 | Lefferts et al. | 188/380 |
| 6,321,890 | B1 | * | 11/2001 | Suzuki et al. | 188/379 |
| 6,397,988 | B1 | * | 6/2002 | Ptak | 188/380 |
| 6,412,586 | B1 | * | 7/2002 | Askew | 180/309 |
| 6,478,110 | B1 | * | 11/2002 | Eatwell et al. | 181/207 |
| 6,676,116 | B2 | * | 1/2004 | Edberg et al. | 267/136 |
| 6,758,300 | B2 | * | 7/2004 | Kromis et al. | 180/309 |
| 2002/0046901 | A1 | * | 4/2002 | Zapfe | 181/206 |
| 2004/0255712 | A1 | * | 12/2004 | Ruhlander | 74/502.4 |

* cited by examiner

*Primary Examiner*—Jeffrey Donels
*Assistant Examiner*—Jeremy Luks
(74) *Attorney, Agent, or Firm*—Quinn Law Group, PLLC

(57) ABSTRACT

A resonant frequency adjustor for mounting onto an exhaust pipe of an exhaust system of a vehicle adjusts the resonant frequency(s) of the exhaust pipe to minimize or control vibration transmitted to the vehicle and/or to tune the sound emitted by the exhaust system. The resonant frequency adjustor includes a base mounted to the exhaust pipe, an isolator attached to the base, a stud attached to and extending from the isolator, and a mass located on the stud. A gross adjustment of the vibration of the exhaust pipe may be achieved by varying the location of the resonant frequency adjustor on the exhaust pipe. A fine adjustment of the vibration of the exhaust pipe may be accomplished by adjusting the position of the mass on the stud.

15 Claims, 3 Drawing Sheets

RESONANT FREQUENCY ADJUSTOR AND METHOD OF UTILIZING THE SAME

CROSS REFERENCE TO RELATED APPLICATION

The instant application claims priority to U.S. Provisional Patent Application Ser. No. 60/748,388, filed Dec. 8, 2005, the entire specification of which is expressly incorporated herein by reference.

BACKGROUND OF THE INVENTION

1. Field of the Invention

The present invention relates to a resonant frequency adjustor and more specifically a resonant frequency adjustor for controlling noise and vibration from an exhaust system of a vehicle and method of utilizing the same.

2. Description of the Prior Art

Combustion engines of vehicles are required to operate over a wide range of speeds (i.e. idle to wide open throttle), and flow the resultant exhaust gas through an exhaust system to in-part muffle noise, route potentially toxic fumes to a safe location toward the rear of the vehicle, and at least partially reduce emissions hazardous to the environment. With varying engine speeds, varying engine vibration is transmitted to the exhaust pipe of the exhaust system along with the varying flow of exhaust gas. The transmitted engine vibration and the exhaust gas flow contribute toward vibration of the exhaust system and pipe. This vibration of the exhaust system can be transferred to the rest of the vehicle and may also affect the sound emitted by the exhaust system.

For luxury vehicles that typically strive to reduce noise and vibration within the passenger compartment to a minimum, any vibration and noise transmitted from the exhaust system is generally undesirable. For some sport vehicle applications, transmitted vibration from the exhaust system is generally undesirable, however, certain noises such as a deem rumbling sound may be desirable from the exhaust system. Regardless, undesirable vibration of the exhaust system that is typically transmitted through a frame or chassis of the vehicle and into of the interior is typically annoying and adds to discomfort for a vehicle passenger.

Mounts used to mount the exhaust pipe to the frame of the automobile may be used to isolate the vibration of the exhaust pipe preventing its transmission to the frame. Such mounts are generally expensive and some materials of the mounts may degrade over time thereby allowing increased vibration transfer to the frame. For exhaust systems having resonating frequency(s) that generally conform or match the vibrations produced by the engine and exhaust flow at a common engine speed, that degradation rate of such mounts can be further aggravated.

Additionally, some vibrations of certain frequencies may have a desirable affect on the sound emitted by the exhaust system. For example, a persona of a vehicle may be defined by a roaring or rumbling exhaust sound. More specifically, such a roar or rumble may be desirable if the vehicle is a motorcycle or an automobile such as a so called hot rod or muscle car.

It is desirable to manufacture a resonant frequency adjustor that may dampen the vibration of an exhaust pipe of a vehicle to minimize the vibration transferred to the adjacent frame. In addition, it is desirable to manufacture a resonant frequency adjustor that may also be used to tune the sound emitted by the exhaust system.

SUMMARY OF THE INVENTION AND ADVANTAGES

A resonant frequency adjustor for mounting onto an exhaust pipe of an exhaust system of a vehicle adjusts the resonant frequency(s) of the exhaust pipe to minimize or control vibration transmitted to the vehicle and/or to tune the sound emitted by the exhaust system. The resonant frequency adjustor includes a base mounted to the exhaust pipe, an isolator attached to the base, a stud attached to and extending from the isolator, and a mass located on the stud. A gross adjustment of the vibration of the exhaust pipe may be achieved by varying the location of the resonant frequency adjustor on the exhaust pipe. A fine adjustment of the vibration of the exhaust pipe may be accomplished by adjusting the position of the mass on the stud.

The resonant frequency adjustor may be mounted to the exhaust pipe to change the resonate frequency of the exhaust pipe to minimize the vibration of the exhaust pipe over a wide range of engine speeds thereby decreasing the vibration transferred to the vehicle. Alternatively, the resonant frequency adjustor may be mounted to the exhaust pipe to change the resonate frequency of the exhaust pipe to tune the vibration of the exhaust pipe such that the exhaust system emits a distinctive and desirable noise.

The weight of the resonant frequency adjustor on the exhaust pipe affects the resonate frequency of the exhaust pipe. A gross adjustment of the vibration of the exhaust pipe may be achieved by varying the location of the resonant frequency adjustor along the exhaust pipe. A fine adjustment of the resonate frequency of the exhaust pipe may be accomplished by adjusting the position of the mass on the stud to change the moment of the mass about the tab mounted to the exhaust pipe. An ideal position of the resonant frequency adjustor on the exhaust pipe and an ideal position of the mass on the stud may be identified, for example, by computer modeling or by trial and error.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
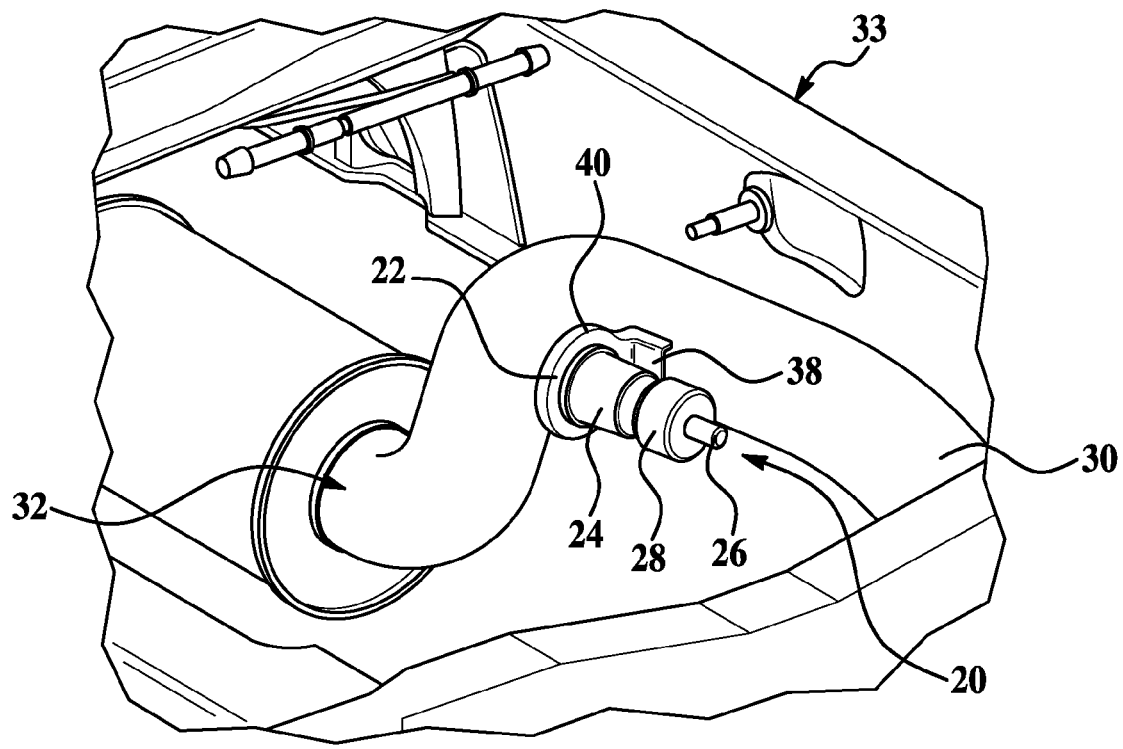
FIG. 1 is a perspective view of a resonant frequency adjustor mounted on an exhaust system of a vehicle.
Figure 2:
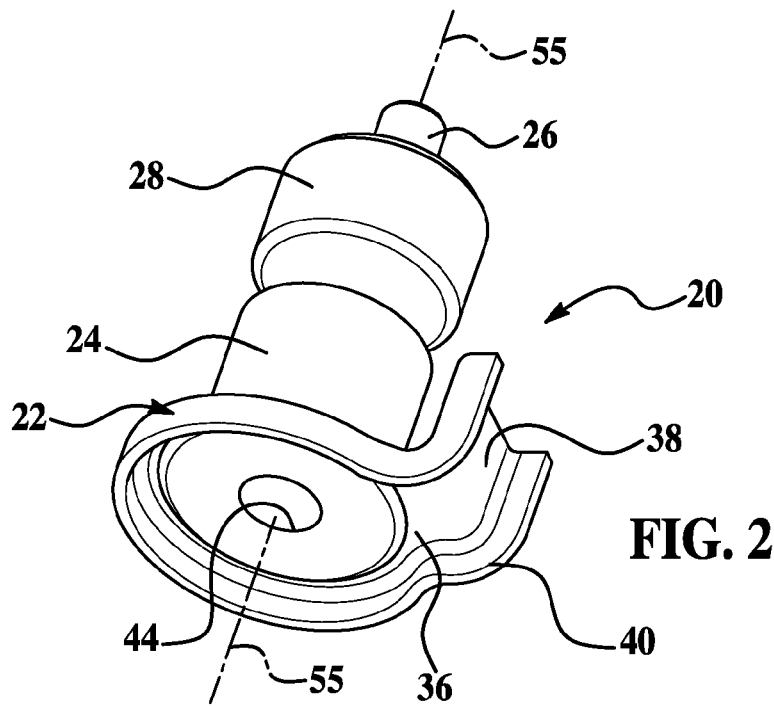
FIG. 2 is a perspective view of the resonant frequency adjustor.
Figure 3:
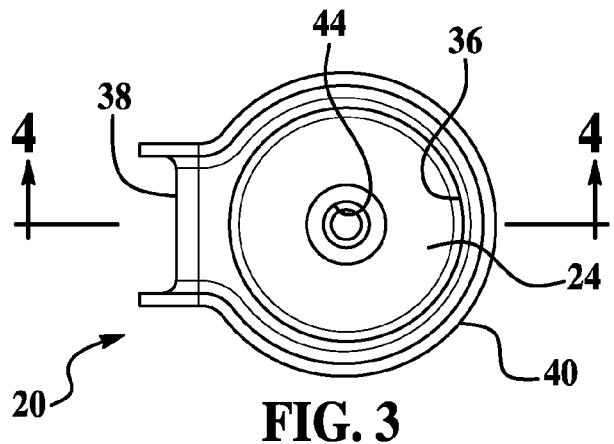
FIG. 3 is a bottom view of the resonant frequency adjustor.
Figure 4:
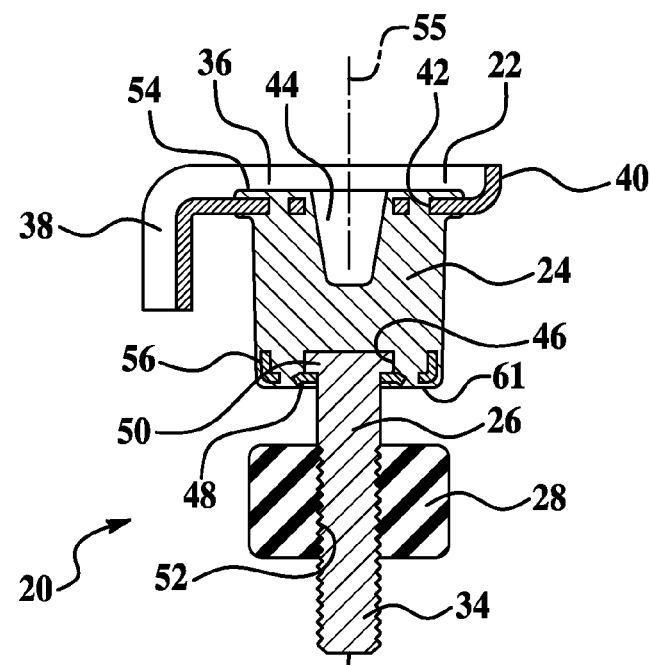
FIG. 4 is a cross section of the resonant frequency adjustor taken along the line 4-4 of FIG. 3.

Referring to the Figures, wherein like numerals indicate corresponding parts throughout the several views, a resonant frequency adjustor is generally shown at 20. As shown in FIGS. 1, 2, and 4, the resonant frequency adjustor 20 includes a base 22, an isolator 24 attached to the base 22, an elongated stud 26 attached to and extending from the isolator 24, and a mass 28 connected to the stud 26. As seen in FIG. 1, for example, the resonant frequency adjustor 20 may be mounted to an exhaust pipe 30 of an exhaust system 32 of a vehicle 33 to generally control vibration and noise by effectively adjusting the resonating frequency(s) of the system 32. The term vehicle 33 includes automobiles, marine and utility applications such as boats and tractors, and anything that typically transports a passenger.

As best shown in FIGS. 1-4, the base 22 preferably includes a platform 36, a tab 38 extending from the platform 36, and a peripheral flange 40 extending at least partially around a circumference of the platform 36 and along the tab 38. The flange 40 is substantially perpendicular to the platform 36 and the tab 38. The platform 36 is substantially circular and the tab 38 is substantially rectangular and extends from the platform 36 at substantially a right angle. The flange 40 generally serves as a welding or securing point of the base 22 to the exhaust pipe 30, and may partially isolate the platform 36 and isolator 24 from potentially damaging heat transferring off the pipe 30. One skilled in the art would now know that the tab 38 may not always be a useful component of the base 22, especially when the base is secured to a straight section of the pipe 30. However, when the base 22 is secured to a bent portion of the pipe 30, the tab 38 serves as an additional attachment or weld point for the adjustor 20.

Preferably, the platform 36, the tab 38, and the flange 40 form one continuous and unitary base 22. For example, a single blank may be stamped to form the platform 36, the tab 38, and the flange 40. Alternatively, the platform 36, the tab 38, and/or the flange 40 may be discrete components that are attached together. For example, the platform 36, the tab 38, and/or the flange 40 may be welded together to form one base 22. The base 22 is preferably made of the same or similar material as the exhaust pipe 30 (such as steel) to prevent galvanic and/or corrosive reactions. Alternatively, the flange 40 may be adhered to the exhaust pipe 30 with an adhesive.

Figure 5:
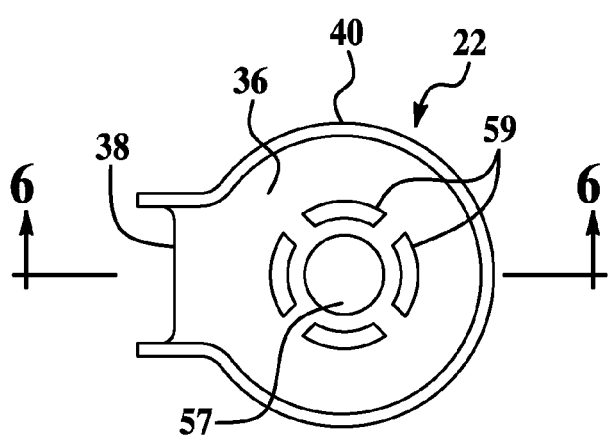
FIG. 5 is a bottom view of a base of the resonant frequency adjustor.
Figure 6:
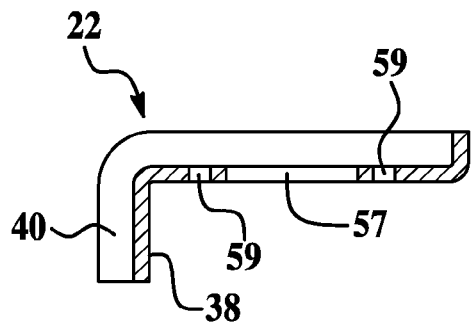
FIG. 6 is a cross section of the base taken along line 6-6 of FIG. 5.

Referring to FIGS. 4-6, the substantially circular platform 36 is generally centered and perpendicular to a centerline 55 that traverses the exhaust pipe 30. A through bore 57 in the platform 36 is defined by a continuous and substantially circular lip 54 of the platform. A series of engagement holes 59 (preferably four as illustrated) in the platform 36 are located radially outward from the continuous lip 54 and are spaced circumferentially apart from one another with respect to the centerline 55. During manufacturing of the adjustor 20, the isolator 24 is preferably molded directly to the base 22 such that the material of the isolator 24 forms through the holes 59 and the bore 57 for a reliable engagement of the isolator 24 to the base 22. The isolator 24 is preferably cylindrical and extends longitudinally along the centerline 55.

A blind bore or frusto-conical cavity 44 is preferably molded into the isolator 24 and opens axially with respect to the centerline 55 toward the exhaust pipe 55. This cavity 44 is co-axial to and generally extends through the bore 57 of the base 22, and enhances flexibility of the isolator 24 while maintaining a strong bond to the base 22. The isolator 24 is preferably made of heat resistant silicone or any variety of other heat resistant materials that are resiliently flexible. One skilled in the art would now know that because the isolator 24 is resiliently flexible, the isolator may be pre-molded separate from the base 22 and with a continuous groove 42 opened radially outward. The isolator 24 may then be attached to the base 22 by press fitting the lip 54 into the groove 42.

The isolator 24 projects axially from the base 22 to a distal end 61. During the same molding process of the isolator 24 previously described, the distal end 61 is preferably molded about a radially enlarged head 50 at a base end of the stud 26. An elongated member or support rod 34 of the stud 26 projects axially outward along the centerline 55, through the isolator distal end 61 and to a distal end 63 of the rod 34 opposite the enlarged head 50. Preferably, inserts 56 and a retainer ring 48 are molded into the distal end 61 of the isolator 24 to reinforce the engagement of the stud 26 to the isolator 24. Preferably, the inserts 56 and the ring 48 are steel and more preferably SAE 1008/1010. The stud 26 is preferably made of a solid and rigid material such as, for example, metal or plastic. One skilled in the art would now know that the isolator 24 may be molded separate from the stud 26 and with a cylindrical cavity 46 at the distal end 61. The enlarged head 50 of the stud 26 may then be press fitted into the cavity 46.

The mass 28 is substantially cylindrical and generally donut shaped, and is adjustably oriented along rod 34 of the stud 26. As shown in FIG. 4, the mass 28 defines a through bore 52 disposed concentrically to the centerline 55. Preferably, the bore 52 is generally defined by female threads carried by the mass 29. The rod 34 carries male threads for threaded engagement to the mass 28 in the bore 52.

When utilizing the resonant frequency adjustor 20, one should first realize that exhaust systems 32 typically have a plurality of resonating frequencies. During operation of the vehicle, any one or more of the resonating frequencies may become pronounced causing vibration and noise in different or all areas of the vehicle and dependent upon the operating condition of the combustion engine (i.e. rpm and/or load). That is, vibration of a running engine and the exhaust gas flowing through the exhaust pipe 30 of the exhaust system 32 create vibrations of the exhaust pipe 30. Vibration of the exhaust pipe 30 may be transferred to the rest of the vehicle and may affect the sound emitted by the exhaust system 32. If the frequency of a vibration is close to or matches one of the resonating frequencies of the exhaust system 32, the vibration may become more pronounced.

The resonant frequency adjustor 20 may be mounted to the exhaust pipe 30 to dampen the vibration of the exhaust pipe 30. The weight of the resonant frequency adjustor 20 on the exhaust pipe 30 affects the resonate frequency of the exhaust pipe 30. For example, the resonant frequency adjustor 20 may be mounted to the exhaust pipe 30 to change the resonate frequency of the exhaust pipe 30 to minimize the vibration of the exhaust pipe 30 over a wide range of engine speeds or at a pre-selected engine speed, thereby decreasing the vibration transferred to the vehicle. Alternatively, the resonant frequency adjustor 20 may be mounted to the exhaust pipe 30 to change the resonate frequency of the exhaust pipe to tune the vibration of the exhaust pipe 30 such that the exhaust system 32 emits a distinctive and desirable sound.

A gross adjustment of the vibration of the exhaust pipe 30 may be achieved by varying the location of the resonant frequency adjustor 20 along the exhaust pipe 30. If the minimizing of vibration of the exhaust pipe 30 is sought, an ideal location of the resonant frequency adjustor 20 on the exhaust pipe 30 will accomplish a maximum vibration dampening across the largest range of engine speeds. Alternatively, the ideal location of the resonant frequency adjustor 20 on the exhaust pipe 30 may be varied to achieve a desired sound emitted by the exhaust system 32. The ideal location for the resonant frequency adjustor 20 on the exhaust pipe 30 may be identified, for example, by computer modeling or empirically (by trial and error).

Figure 7:
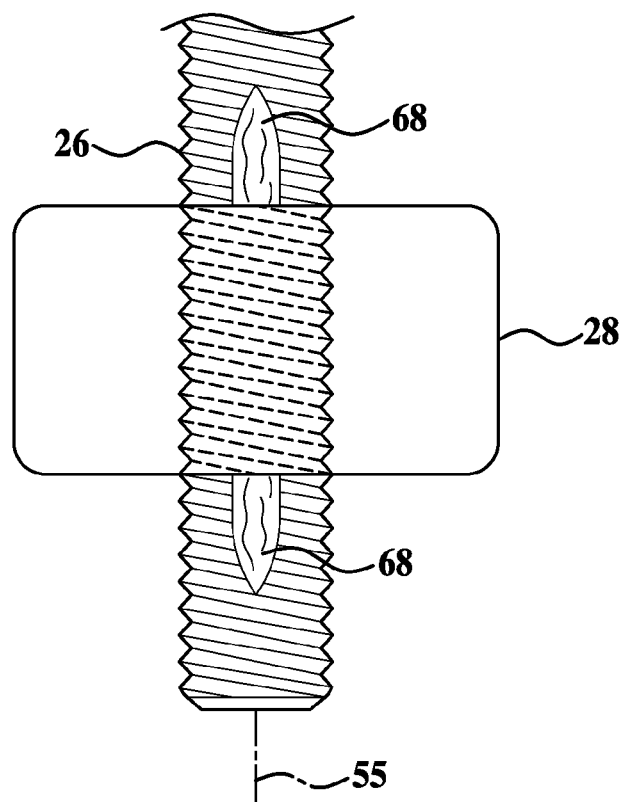
FIG. 7 is an enlarged partial side view of the resonant frequency adjustor.

A fine adjustment of the resonate frequency of the exhaust pipe 30 may be accomplished by adjusting the axial position of the mass 28 on the stud 26. Changing the position of the mass 28 along the stud 26 changes the moment of the mass 28 about the base 22 thereby changing the resonate frequency of the exhaust pipe 30. Because the isolator 24, stud 26 and mass 28 are all substantially cylindrical and concentric to one another, the moment of the mass 28 is not effected by its radial position, which remains constant as the mass 28 is adjusted axially along the stud 26. An ideal axial position of the mass 28 on the stud 26 may be identified, for example, by computer modeling or empirically (by trial and error). Preferably, this adjustment is performed by rotating the mass 28 about the stud 26. The threaded engagement between the two will then act to axially adjust the mass 28 on the stud 26. As best shown in FIG. 7, once the desired location is established, plastic deformations 68 of the male threads located axially inward and outward of the mass 28 are formed preferably by crimping to prevent the mass 28 from misaligning itself.

Figure 8:
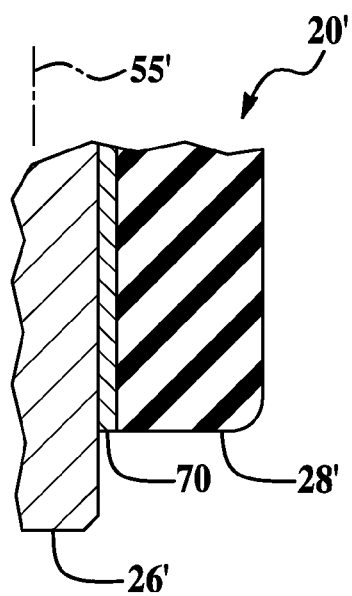
FIG. 8 is an enlarged partial cross section of a second embodiment of a resonant frequency adjustor illustrating an adhesive securing a stud to a mass.

Alternatively, a lock nut (not shown) can be threaded to the stud 26 for locking the mass 28 in place. Yet further, the threaded engagement can be replaced with a press fit between the stud 26 and the mass 28. In this modification, the outer diameter of the rod 34 may be slightly greater than an inner diameter of the through bore 52 in the mass 28. Yet further, one skilled in the art would now know that the mass 28 may be held in position on the rod 34 with a clip (not shown) or with cotter pins (not shown). In another modification and as best shown in FIG. 8, a mass 28' of an adjustor 20' may be secured to a stud 26' with an adhesive 70.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

The invention claimed is:

1. A resonant frequency adjustor for an exhaust system of a vehicle, the resonant frequency adjustor comprising:
    a resiliently flexible isolator projecting outward from the exhaust system;
    an elongated stud having a base end engaged to the isolator and a free distal end;
    a rigid base attached directly to an exhaust pipe of the exhaust system, wherein the isolator is spaced from the exhaust pipe and attached to the base;
    a centerline extending transversely outward from the exhaust pipe;
    a platform of the base having a continuous lip defining a hole in the platform; and
    a groove in the isolator opened radially outward with respect to the centerline, wherein the lip projects radially inward into the groove; and
    a mass engaged to the stud.

2. The resonant frequency adjustor set forth in claim 1 wherein the mass is spaced and cantilevered outward from the isolator.

3. The resonant frequency adjustor set forth in claim 1 wherein the isolator is silicone.

4. The resonant frequency adjustor set forth in claim 1 further comprising a bore in the mass wherein the stud extends through the bore.

5. The resonant frequency adjustor set forth in claim 4 wherein the mass is press fitted adjustably along a centerline of the elongated stud.

6. The resonant frequency adjustor set forth in claim 4 wherein the mass is threaded adjustably to the stud.

7. The resonant frequency adjustor set forth in claim 4 wherein the mass is engaged to the stud by an adhesive.

8. The resonant frequency adjustor set forth in claim 1 further comprising a plurality of orifices in the platform spaced circumferentially about the hole, wherein the isolator is molded to the platform and in the orifices.

9. The resonant frequency adjustor set forth in claim 1 wherein the isolator is generally hollow.

10. The resonant frequency adjustor set forth in claim 1 further comprising a blind cavity in the isolator opened axially inward with respect to the exhaust pipe and the centerline.

11. A resonant frequency adjustor for an exhaust system of a vehicle, the resonant frequency adjustor comprising:
    a rigid base attached directly to an exhaust pipe of the exhaust system;
    a resiliently flexible and heat resistant isolator engaged to and projecting outward from the base;
    an elongated threaded stud having a base end engaged to the isolator and a free distal end;
    a centerline disposed transversely to the exhaust pipe, wherein the isolator, the stud, and the mass are disposed concentrically to the centerline;
    a platform of the base disposed perpendicular to the centerline; and
    a peripheral flange of the base projecting axially inward from the platform with respect to the centerline for attachment to the exhaust pipe; and
    a mass carrying female threads for threaded adjustable engagement to the stud.

12. The resonant frequency adjustor set forth in claim 11 wherein the isolator, the stud and the mass are cylindrical.

13. The resonant frequency adjustor set forth in claim 11 wherein the flange is welded to the exhaust pipe.

14. The resonant frequency adjustor set forth in claim 13 further comprising a tab of the base projecting axially outward from the platform for selective engagement to the exhaust pipe.

15. A resonant frequency adjustor for an exhaust system of a vehicle, the resonant frequency adjustor comprising:
    a rigid base attached directly to an exhaust pipe of the exhaust system;
    a resiliently flexible and heat resistant isolator engaged to and projecting outward from the base;
    an elongated threaded stud having a base end engaged to the isolator and a free distal end;
    a mass carrying female threads for threaded adjustable engagement to the stud;
    the base end being an enlarged head;
    metallic inserts embedded in the isolator near the enlarged head; and
    wherein the isolator is molded directly to and extends between the rigid base and the enlarged head.

* * * * *